(12) United States Patent  
Ballew

(10) Patent No.: US 6,412,341 B1
(45) Date of Patent: Jul. 2, 2002

(54) TRANSMISSION FLUID CONDITIONING APPARATUS AND METHOD FOR FACILITATING CONDUCTION OF TRANSMISSION COOLANT FLOW TEST

(76) Inventor: Walter J. Ballew, 1784 Hampton, Grosse Pointe Woods, MI (US) 48234

( * ) Notice: Subject to any disclaimer, the term of this patent is extended or adjusted under 35 U.S.C. 154(b) by 0 days.

(21) Appl. No.: 09/379,125

(22) Filed: Aug. 23, 1999

Related U.S. Application Data

(60) Provisional application No. 60/098,489, filed on Aug. 31, 1998.

(51) Int. Cl.$^7$ .............................................. G01M 15/00
(52) U.S. Cl. ...................................... 73/118.1; 184/1.5
(58) Field of Search ................................ 73/116, 117.2, 73/117.3, 118.1, 119 R; 184/1.5; 340/450.3

(56) References Cited

U.S. PATENT DOCUMENTS

| | | | |
|---|---|---|---|
| 4,689,144 A | | 8/1987 | Holmes |
| 4,732,036 A | * | 3/1988 | Weeder ...................... 73/118.1 |
| 4,809,544 A | * | 3/1989 | Magoolaghan ............. 73/118.1 |
| 5,240,151 A | * | 8/1993 | Worm |
| 5,318,080 A | * | 6/1994 | Viken |
| 5,427,202 A | * | 6/1995 | Behring et al. |
| 5,482,062 A | * | 1/1996 | Chen |
| 5,535,766 A | * | 7/1996 | Edwards |
| 5,564,525 A | * | 10/1996 | Dunnegan et al. |
| 5,626,170 A | * | 5/1997 | Parker |
| 6,062,275 A | * | 5/2000 | Rome et al. |
| 6,071,355 A | * | 6/2000 | Suratt |
| 6,131,701 A | * | 10/2000 | Camacho et al. |
| 6,139,737 A | * | 10/2000 | Gizowski |

* cited by examiner

Primary Examiner—Eric S. McCall
(74) Attorney, Agent, or Firm—Young & Basile, P.C.

(57) ABSTRACT

A transmission fluid conditioning apparatus and method for facilitating the conduction of a transmission coolant flow test includes the provision of a fluid receptacle in the form of an open ended container having a internal volume for receiving a test amount of transmission coolant fluid. At least the transmission fluid flow filter is prestored within the fluid receptacle to facilitate use of the fluid receptacle in conducting a coolant flow test each time the transmission filter is replaced on a vehicle. Filter installation connection components including at least one of a hose, hose clamp and hose fitting, may also be prestored within the container. A closure lid is removably mountable over the open end of the container. Indicia are formed on the fluid receptacle for indicating good and bad coolant flow tests by the fluid level within the receptacle within a predetermined test time period. Printed instruction for conducting a transmission coolant flow test may also be provided on a label attached to the fluid receptacle.

16 Claims, 3 Drawing Sheets

AUTOMATIC TRANSMISSION COOLER CONDITIONING KIT
2-98 TFE 02-A2

Kit includes
- Flow test container
- Magneline Filter
- Hose clamps
- Cooler line hose
- Cooler line connectors (some models)
- Service decal
- 1 Instructions & Specifications

CUSTOMER SERVICE

1-XXX-XXX-XXXX
Mon-Fri 8 AM - 5 PM EST
SAFETY CAUTION:
Transmission fluid may be hot. Always wear safety glasses and protective clothing.

MAX. FILL LINE
- 1 Quart
- 24oz.
- 1/2 Qt = 16oz.
- 8oz.

MAX. FILL LINE
- 1 Liter
- 750cc
- 500cc
- 250cc

FLOW TEST INDICATOR

FLOW TEST INSTRUCTIONS
After cooler flush, transmission and filter installation, perform this flush test:

1. SAFETY FIRST: Wear protective clothing. check wheels, set parking brake, vent exhaust
2. Idle motor in park for 5 minutes. then turn off.
3. Disconnect cooler return line at case fitting. Connect hose over return line tubing and insert other end of hose into transmission filter tube.
4. Start engine in park and run at idle.
5. When steady flow is observed from fill tube hose end, place hose into flow test container. Collect fluid for 15 seconds or until fluid reaches <u>maximum fill line</u>.
6. Place hose back into fill tube and turn engine off.
7. Read fluid level on container flow test indicator. Compare to flow specification chart.
8. If level is below specified volume, refer to Service Manual for cooler system repair.
9. When flow is to specification; reconnect cooler lines, idle motor, check for leaks and top off transmission fluid as required.

FIG - 4

TRANSMISSION FLUID CONDITIONING APPARATUS AND METHOD FOR FACILITATING CONDUCTION OF TRANSMISSION COOLANT FLOW TEST

CROSS REFERENCE TO CO-PENDING APPLICATION

This application claims the benefit of the filing date of now abandoned provisional application Ser. No. 60/098,489 filed Aug. 31, 1998, the entire contents of which are incorporated herein by reference.

BACKGROUND OF THE INVENTION

1. Field of the Invention

The present invention relates, in general, vehicle transmissions and, more specifically, to transmission coolant test apparatus and methods.

2. Description of the Art

Transmission fluid is used to lubricate and cool automatic transmissions such as those used in internal combustion engines in vehicles, such as cars, trucks, vans, etc. The high operating temperatures of automatic transmissions causes heat to be absorbed by the transmission fluid which must be removed to obtain the optimum lubrication performance of the transmission fluid.

Typically, an air to oil heat exchanger or an oil to coolant water heat exchanger separate from or integrated in the bottom portion of the vehicle radiator receives a coolant inlet line or conduit from the transmission and has an outlet conduit connected to the transmission to circulate transmission fluid between the transmission and the cooler to remove heat from the lubrication fluid.

During normal operation the various components of the transmission, such as gear sets, friction elements, bushing, thrust washers, for example, shed metal and non-metallic particles. When one or more components wears or fails, a significant amount of particulates become entrained in the transmission fluid which, as described above, continually circulates between the transmission and the cooler. Such particulates become lodged in the various components of the transmission and the cooler. Due to the close tolerances employed in various transmission components, such as valves, etc., such particulates can interfere with the normal operation of the component and/or transmission and can lead to a catastrophic failure of the transmission. Likewise, a significant accumulation of particulates within the cooler can clog the transmission fluid circulating inlet and outlet conduits and/or flow paths through the cooler thereby reducing the quantity of transmission fluid flowing to and from the cooler which results in an elevation of the temperature of the fluid causing it to lose a significant portion of its lubricating characteristics as well as reducing the lubricating effect of the fluid since reduced amounts of the fluid reach the individual components of the transmission. Hard particulates can also increase wear on contact surfaces, such as spalting of gear sets and scoring on thrust surfaces. Any of these conditions lead to a premature, catastrophic transmission failure.

Most OEM equipment procedures include periodic flushing of the cooler system, either as a preventative maintenance routine or a repair practice after catastrophic failure. However, flushing is not adequate to assure that the specified flow rate has been restored.

A coolant flow test can be performed on a transmission at any time during the operational life of the transmission or after a transmission has been rebuilt or a new transmission installed in a vehicle to check for an adequate flow rate through the cooler. In-line flow rate test equipment is available to provide direct read out of flow rate rather than resultant flow volume. One method to confirm cooler flow rate involves disconnection of the transmission fluid outlet conduit at the transmission and a timed collection of the fluid flowing through the conduit when the transmission fluid is at operational temperature, the transmission in neutral and the engine in an idle state. For example, a normal transmission coolant flow rate should yield a specific volume of fluid per minute. The collection of significantly lesser amounts of fluid within the set time period indicates that the transmission fluid cooler is clogged with particulates and should be flushed and/or replaced.

However, while the coolant flow test is relatively simple to conduct and takes only a short time to complete, transmission repair personnel typically forget or do not perform the test. Often this is due to lack of awareness of the procedure, performance specifications and the availability of test apparatus. This could lead to a situation where the metal particulates trapped within the cooler immediately become re-entrained in the transmission fluid upon the next engine operation which causes such particulates to be recirculated through the transmission. This could also lead to a situation where the particulates either occlude the cooler, restricting flow or the particulates become trapped again leading to the development of wear or contamination failure modes which will necessitate repair or replacement of the transmission.

It is also known to provide transmission fluid filters, such as that disclosed in U.S. Pat. No. 4,689,144, which utilize an internal magnet to attract metal particles entrained within the fluid as the fluid flows through the filter. However, the filter may become clogged and restrict flow or, if equipped with a bypass valve, allow contamination to recirculate. Further, the use of such a filter still requires a periodic transmission fluid flow test to ensure that all metal particles have been removed from the transmission fluid and to ensure that the fluid circulation system is operating properly since such filters cannot detect or protect against other causes of flow restriction, such as kinked or crimped hoses and tubing.

Thus, it would be desirable to provide a transmission fluid conditioning apparatus which encourages the conduction of a transmission fluid coolant flow test and the installation of a filter, preferably with bypass capabilities, each time a transmission fluid filter is installed in a transmission fluid line in a vehicle transmission. It would also be desirable to provide a transmission fluid conditioning apparatus which provides a quick indication of the level of contaminants in transmission fluid during a transmission fluid coolant flow test.

SUMMARY OF THE INVENTION

The present invention is a transmission fluid conditioning apparatus and method for facilitating conduction of transmission fluid coolant flow test. The method comprises the steps of providing a fluid receptacle having a fluid capacity sufficient for receiving a predetermined test amount of transmission coolant from a vehicle transmission and for storing a vehicle fluid filter in the fluid receptacle as a prepackaged kit. In another aspect, the method includes the step of storing transmission fluid filter installation connection components in the fluid receptacle. In one aspect, the method includes providing the fluid receptacle with an open end having an aperture sized for receiving transmission coolant fluid discharged from a vehicle transmission, and for removably closing the open end of the fluid receptacle prior to use.

The step of closing the open end of the fluid receptacle further comprises the steps of mounting a removable lid over the open end of the fluid receptacle, storing filter installation connection components in the fluid receptacle. The fluid installation components include at least one of a hose, a hose clamp and a hose connection fitting.

The method, in another aspect, includes the steps of providing indicia on the fluid receptacle indicating transmission coolant fluid quantities contained within the fluid receptacle during a transmission coolant flow test. In a preferred aspect, the method includes the step of providing at least two indicia on the fluid receptacle respectively indicative of a good transmission coolant fluid flow test wherein the upper level of the transmission fluid within the fluid receptacle during a transmission coolant flow test corresponds substantially to the location of one indicia, and, to indicate an unacceptable flow test when the transmission fluid collected during a predetermined test time period when conducting a transmission coolant flow test is below or at substantially the same level as the second indicator on the fluid receptacle.

A third indicia is spaced between the first and second indicia on the fluid receptacle and associated with a transmission fluid level in the fluid receptacle during conduction of a transmission coolant flow test indicative of an acceptable flow test.

In another aspect, the method includes the step of providing indicia on the fluid receptacle containing transmission fluid coolant flow test instructions.

The present invention also comprises a transmission fluid conditioning apparatus which includes a fluid receptacle having an aperture for receiving transmission fluid during a transmission coolant flow test, and a transmission fluid filter prestored within the container to facilitate conduction of a transmission coolant flow test whenever the filter is installed in a vehicle transmission.

The aperture in the fluid receptacle preferably comprises an open end. A closure member is provided for releasably closing the open end of the fluid receptacle.

In one aspect, fluid installation components are prestored within the fluid receptacle for installing the transmission coolant fluid filter in a vehicle transmission coolant circuit. The fluid filter installation connection components preferably include at least one of a hose, a hose clamp and a hose fitting.

Indicia is provided on the fluid receptacle for indicating at one of a good or bad transmission fluid flow test by the amount of transmission fluid withdrawn from a vehicle transmission and received in the fluid receptacle during a predetermined test time period. The indicia includes first and second indicia on the fluid receptacle respectively indicating a good test and a bad test. A third indicia is optionally carried on the fluid receptacle and disposed between the first and second indicia for indicating an acceptable coolant flow test.

The present apparatus and method facilitates the conduction of a transmission coolant flow test each time a transmission fluid filter on a vehicle is replaced by providing a kit formed of a container or fluid receptacle sized for receiving a test quantity of transmission coolant during a transmission coolant flow test wherein the container also acts as storage medium for the transmission flow filter. In this manner, a service person, when replacing an existing transmission filter with a new filter, has the fluid flow receptacle readily available so as to facilitate the conduction of a coolant flow test in conjunction with replacement of the filter. All of the filter installation connection components can also be prestored in the container depending upon the filter replacement requirements and procedures of a particular vehicle model.

The provision of indicia on the fluid receptacle further simplifies the conduction of the transmission coolant flow test thereby enhancing the probability that the test will be conducted by providing good, bad and, optionally, acceptable test results indications merely by looking at the fluid level within the receptacle. A label containing printed instructions for conducting the coolant flow tests may also be mounted on the receptacle to simplify the conduction of the fluid flow test.

The use of the prestored filter installation components in a container sized to act as a coolant flow test receptacle simplifies the conduction of the coolant flow test each time the transmission filter is replaced since all of the components necessary for conducting the coolant flow test, including test instructions and good, bad and even acceptable test result indicators are provided on the container which also acts as a storage and transport media for the filter and filter installation components.

BRIEF DESCRIPTION OF THE DRAWINGS

The various features, advantages and other uses of the present invention will become more apparent by referring to the following detailed description and drawing in which:

FIG. 4 is a pictorial representation of a label according to one aspect of the invention which is placable on the container shown in FIG. 3.

DESCRIPTION OF THE PREFERRED EMBODIMENTS

Figure 1:
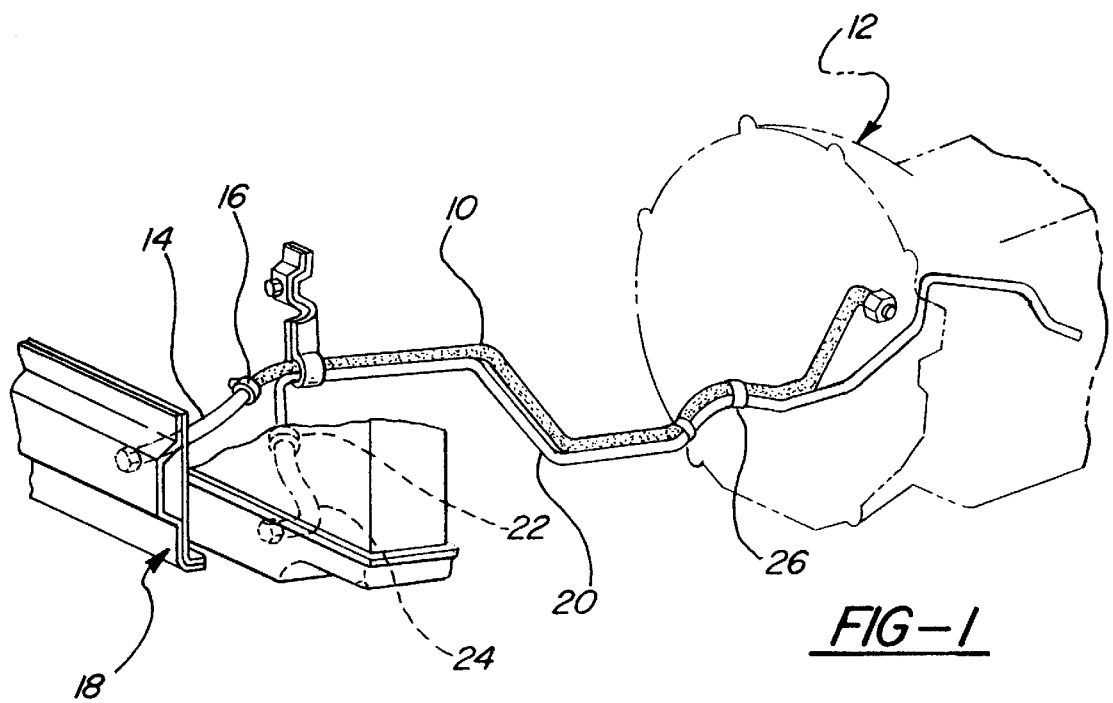
FIG. 1 is perspective view of one example of a vehicle transmission fluid circulation and cooler circuit suitable for use of the present apparatus and method.
Figure 2:
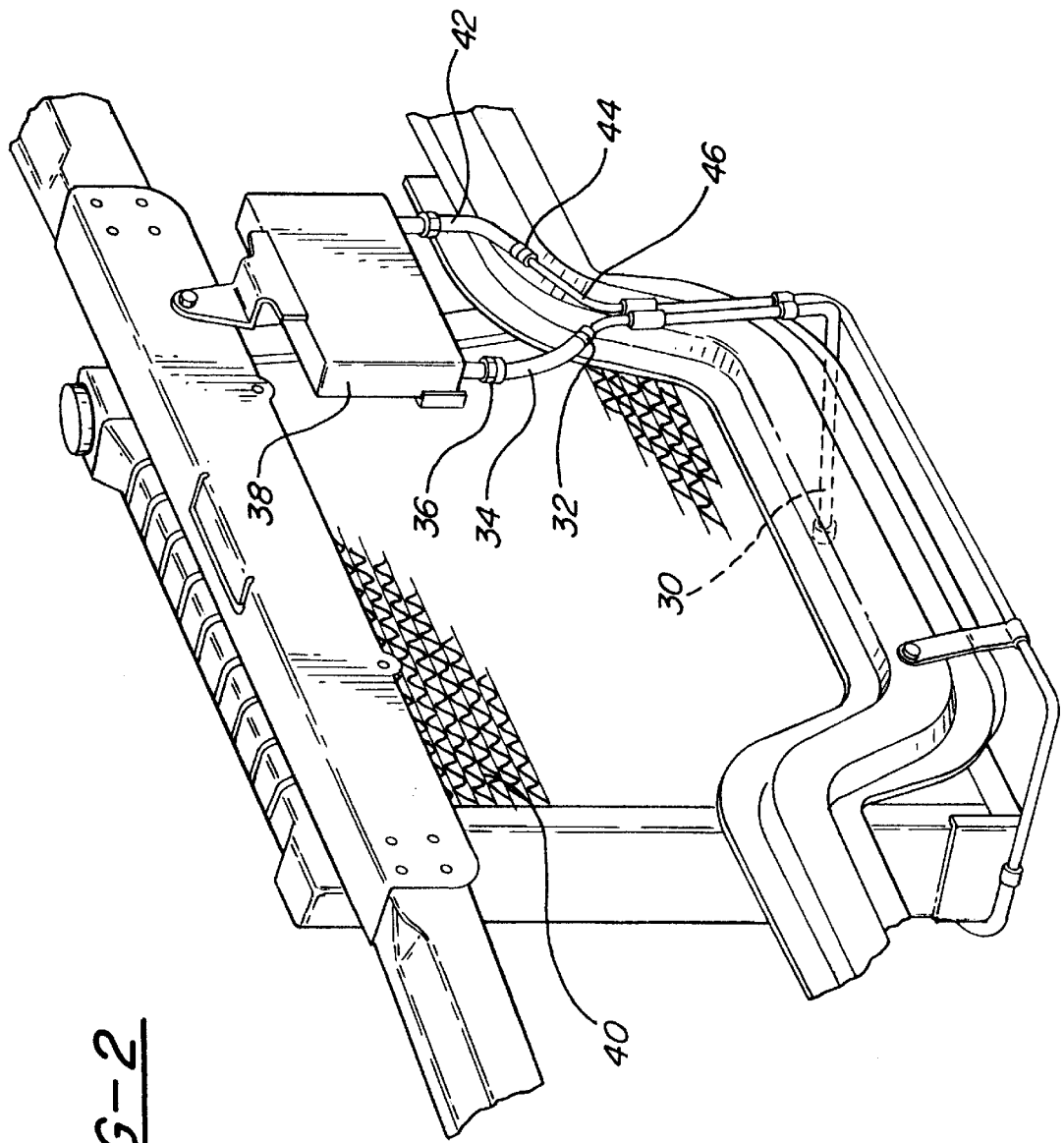
FIG. 2 is a perspective view of another example of a transmission fluid circulation and cooler circuit on which the present apparatus and method may be utilized.

Referring now to FIGS. 1 and 2, by way of background, there are depicted two different transmission fluid circulation and cooler circuits typically found in vehicles, such as trucks or vans. As shown in FIG. 1, a transmission fluid conduit 10 extends from one forward end of a vehicle transmission 12 through an inner cooler in the vehicle radiator. A flexible hose 14 is connected by a clamp 16 to one end of the conduit 10 at one end and through a fitting to an oil to air auxiliary cooler denoted generally by reference number 18 at the other end. A transmission fluid outlet or return line 20 is formed of a return conduit 20 connected by means of a clamp 22 to a flexible hose 24 coupled to the cooler 18. The hose 24 provides a return path for the cooled transmission fluid to the transmission 12. Suitable clamps 26 are connected about the adjacent disposed inlet and outlet conduits 10 and 20 to prevent vibration between the conduits 10 and 20 and to securely mount the conduits 10 and 20 to a stationary vehicle or engine components.

FIG. 2 depicts an alternate transmission fluid coolant recirculation arrangement wherein a fluid inlet line 30 from a forward end of a transmission, not shown, is connected by means of a clamp 32 to a flexible hose 34. The hose 34 is connected by a fitting 36 to a separate, dedicated oil to air, auxiliary cooler 38 mounted in front of the vehicle radiator 40. An outlet hose 42 is connected to the cooler 38 at one end by a fitting or clamp 44 and at another end to a fluid return or outlet conduit 46 which extends rearward into fluid communication with vehicle transmission.

Alternately, an oil to water radiator inter-cooler or heat exchanger can be used by itself.

An in-line transmission fluid filter disclosed in U.S. Pat. No. 4,689,144 includes a pair of outwardly extending spigots 62, 64, each having an annular barb-like flange at one end for securing one end of a hose 80 or 82, to the filter 60 to enable the filter 60 to be mounted in-line in one of the transmission,fluid conduits 10, 20 or the associated hoses.

In the transmission coolant recirculation circuit shown in FIG. 1, such a filter 60 could be installed between either one of the hoses 14 or 24 adjacent the cooler 18 and one end of the inlet and outlet conduits 10 and 20. Similarly, in the fluid flow circuit shown in FIG. 2, the in-line filter 60 could be installed in either one of the hoses 34 and 42 which interconnect the cooler 38 and one end of the inlet conduit 30 and the outlet conduit 46.

During operation of the vehicle transmission, such a filter 60 will eventually become clogged with particulates and must be replaced. It is preferred maintenance that a fluid cooler flow test be conducted each time the in-line filter 60 is replaced or transmission service or repair completed, including transmission replacement. This will insure that significant quantities of the particulates which may be contained within the cooler are removed from the cooler so as to prevent the re-introduction of the particulates into the transmission fluid upon the next engine operation.

Figure 3:
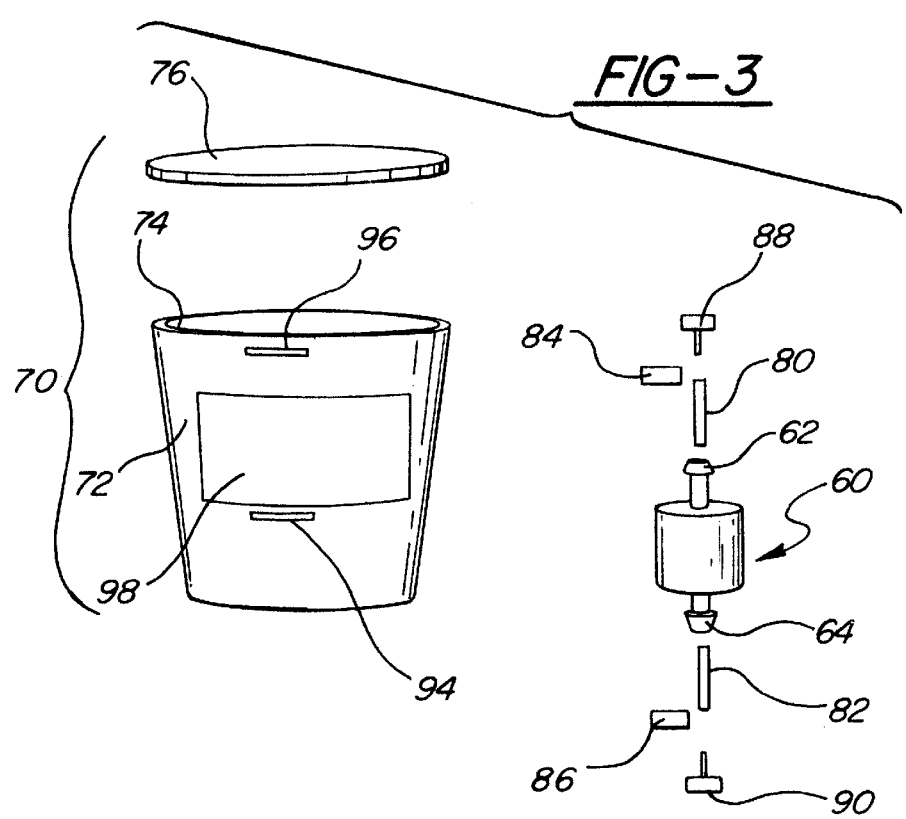
FIG. 3 is an exploded pictorial representation of a transmission fluid conditioning apparatus according to the present invention.

To insure that the transmission fluid flow test is conducted at frequent intervals, and at least each time a new transmission fluid filter 60 is installed, a unique apparatus 70, shown in FIGS. 3 and 4, is provided. The apparatus 70 includes a container or receptacle 72 which is designed to receive and store all of the components of the transmission fluid conditioning apparatus 70 as well as to provide a receptacle or container for receiving transmission fluid during a transmission fluid coolant flow test. The container 72 is formed of an appropriate size, such as slightly larger than one fluid liter in volume, so as to enable a standard transmission fluid coolant flow test to be conducted.

In a preferred embodiment, the container 72 is sized so as not to divert an inappropriate amount of fluid from the lubrication circuits during the test and to minimize fluid replenishment "top off" requirements. By example, the container 72 has a 1½ quart capacity. Preferably, the container 72 is formed of a clear plastic having chemical compatibility with transmission fluid and capable of withstanding operating fluid temperatures as per test procedures without deformation. The container 72 should also be stiff enough to resist deformation when grasped, have a suitable shelf life, and be UV resistant. The container 72 is formed with an open top end which has a large diameter to enable easy collection of transmission fluid from one of the transmission outlet conduits 20 or 46. A lid 76 is removably mountable over the open top end 74 of the container 72 retaining all of the components of the apparatus 70 within the container 72 as well as to keep the interior of the container 72 free of dirt or other debris prior to use.

The container 72 also acts as a package for containing the filter 60 and all of the filter connection components needed to mount the filter 60 to a vehicle transmission and can retain fluid for sampling purposes. This increases the probability that a transmission fluid coolant flow test will be performed by a transmission serviceperson each time he or she replaces the transmission fluid filter and, at the same time, simplifies the conduction of the flow test by providing a readily available and properly sized container to receive the transmission fluid during the test.

The various components of the apparatus 70 which are initially shipped and stored in the container 72 include the in-line fluid filter 60, a pair of short length rubber hoses 80 and 82, a pair of hose clamps 84 and 86, and a pair of brass hose barb to compression fittings 88 and 90.

It will be understood that the various components of the apparatus 70 which are shipped and stored in the container 72 can be provided on a model specific kit basis. That is, a container 72 and only the required components necessary to conduct the transmission coolant flow test and to replace the transmission filter are prestored in the container 72. In addition, a particular manufacturer or fleet owner may specify the specific components to be stored in the container 72. Thus, the above listing of a filter 60, hoses 80 and 82, hose clamps 84 and 86 and fittings 88 and 90 are to be understood to be by example only as each particular vehicle model may have a specific test apparatus according to the present invention constructed with more or less of these named components.

As partially described above, the in-line filter 60 may be installed in one of the inlet or outlet hoses 14 and 24 in the embodiment shown in FIG. 1 or in one of the hoses 34 and 42 in the embodiment shown in FIG. 2 by one of two installation methods. In a first installation method, one of the rubber hoses 14, 24, 34 or 42 is cut and the barbed spigots 62 and 64 on the filter 60 forced into the cut ends of the two sections of one of the hoses 14, 24, 34 or 42. The hose clamps 84 and 86 are then installed about the connections between the two sections of the hoses 14, 24, 34 or 42 and the barbed spigots 62 and 64 of the filter 60.

Alternately, a substantial portion of one of the hoses 14, 24, 34 or 42 is removed. The short length hoses 80 and 82 are initially mounted over the barbed spigots 62 and 64 of the filter 60 and held in place by means of the clamps 84 and 86. Compression fittings 88 and 90 are then connected to the opposite ends of the hoses 80 and 82 and to the remaining ends of the hoses 14, 24, 34 or 42 on the vehicle. Another alternative mounting method is to cut an appropriate length of tubing and to install the filter 60 with hose clamps, while not using the compression and hose barb fittings. However, the use of the hose barb fittings is preferred.

Exactly where the in-line filter 60 is installed in the transmission fluid flow path depends on whether the filter 60 is being installed in a new or used vehicle application where the transmission has not been replaced or after a new or rebuilt transmission has just been installed in the vehicle along with other considerations, such as packaging space in the vehicle, an easy to service location and/or in a location to minimize risk of damage due to exposure and leaks.

In the case of the installation of the filter 60 into an existing vehicle where no change has been made to the existing transmission, it is preferred that the filter 60 be installed in the outlet hose 24 or 42 so as to receive and trap any metal particles which may still be contained within the cooler 18 or 38, respectively.

In the second situation where a new or rebuilt transmission has just been installed in the vehicle, the filter 60 is preferably installed in the inlet hose 14 or 34 upstream from the cooler 18 or 38. This will enable the filter 60 to trap any particulates which may be in the new or rebuilt transmission before the particulates reach the cooler 18 or 38.

In use, the transmission fluid conditioning kit 70 will be provided with the filter 60, the hoses 80 and 82, the clamps 84 and 86 and the compression fittings 88 and 90 disposed within the container 72. The lid 76 may be employed by itself to securely retain the components within the container 72. A shrink wrap coating or layer may be applied about the entire container 72 and lid 76. When it is desired to replace an existing in-line filter 60 in a vehicle transmission coolant flow circuit or to install an in-line filter for the first time, the shrink wrap and the lid 76 are removed from the container 72. The filter 60 and various connection components are also removed from the container 72. The filter 60 is then installed into one of the inlet and outlet hoses 14, 24, 34 and 36 as described above depending upon the condition of the vehicle transmission.

After the filter 60 has been installed, the engine is started and operated to bring the transmission fluid up to normal operating temperature. The technician then shuts the engine off and disconnects the rear transmission outlet conduit 20 or 46 in the embodiments shown in FIGS. 1 and 2 at its fitting connection to the rear of the transmission 12. Transmission fluid flowing through the outlet line 20 or 46 will then be collected in the container 72.

As shown in FIG. 3, the container 72 may be provided with various indicia 94 and 96. For example, indicia 94 and 96 are in the form of gradations formed or disposed along the side of the container 72 respectively corresponding to a half quart and one quart of fluid within the container 72. In this manner, the service person can easily determine when running the transmission coolant flow test the exact quantity of transmission fluid which has been collected within the timed interval, such as 30 seconds. Additional gradations may also be provided for greater resolution.

In addition, other indicia or indicators, such as green, yellow and red colored marks or lines, etc. may also be applied on the exterior of the container 72 at appropriate locations. For example, a green line or mark may be associated with the gradation 96 or immediately below the gradation 96 to indicate a good transmission coolant fluid flow test even though exactly one liter of transmission fluid may not have been collected within the 30 second time interval. The space between the gradations 94 and 96 may be colored yellow to indicate an acceptable flow test; but one which may require maintenance to the transmission fluid cooler in the near future. Finally, a red mark may be placed about the gradation 94 to indicate an unacceptable flow test. A specification sheet may be included in the kit for various vehicle models to enable the graduated reading to be properly interpreted.

As shown in FIG. 4, a label 98 may be placed on the exterior of the container 72 at any available location to provide a convenient place for instructions defining the transmission fluid coolant flow test procedure.

The label 98 can be provided with a specific cooler conditioning kit model number as well as a listing of the kit components. The label 98, as shown in FIG. 4, also includes printed step-by-step flow test instructions. Finally, a flow test indicator or scale section 100 is provided on the label 98 and includes, by example, an English fluid units scale 102 and a metric fluid units scale 104, each with gradations and numeric labels of the amount of fluid within the container 72 at each specific gradation.

All of the above features facilitate the conduction of a transmission coolant flow test each time the transmission coolant filter is replaced since all of the components necessary to conduct the coolant test are prepackaged with the filter. This eliminates the need for a service person to obtain each separate component to conduct the coolant fluid flow test. Further, the unique dual purpose container not only acts as a storage receptacle for all of the transmission cooler conditioning or test components, but also acts as a readily available container for receiving the transmission fluid during the coolant flow test. The gradations as well as instructions on the container facilitate the conduction of the coolant flow test as well as an indication of the exact amount of transmission fluid that has been withdrawn from the transmission cooler during the coolant test.

What is claimed is:

1. A method for facilitating a conduction of a vehicle transmission coolant flow test, the method comprising the steps of:

opening a prepackaged kit including a fluid receptacle having a fluid capacity sufficient for holding a test amount of transmission coolant from a vehicle transmission collected during a coolant flow test, the prepackaged kit storing a replacement vehicle transmission coolant fluid filter;

replacing a vehicle transmission coolant fluid filter in a vehicle with the replacement vehicle transmission coolant fluid filter; and using the fluid receptacle to perform the vehicle transmission coolant flow test after the step of replacing the vehicle transmission coolant fluid filter, the transmission coolant flow test including the step of collecting the test amount discharged from a vehicle transmission into an open end of the fluid receptacle during a predetermined time period.

2. The method of claim 1 further comprising the step of:

installing transmission coolant fluid filter installation connection components stored in the fluid receptacle as a part of the kit during the step of replacing the vehicle transmission coolant fluid filter.

3. The method of claim 1 wherein the step of opening the prepackaged kit further comprises the step of:

opening a removable lid over the open end of the fluid receptacle.

4. The method of claim 2 wherein the step of installing filter installation connection components stored in the fluid receptacle as a part of the kit comprises:

installing at least one of a hose, a hose clamp and a hose connection fitting stored as the filter installation connection components as a part of the kit.

5. The method of claim 1 wherein the step of using the filter receptacle to perform the vehicle transmission coolant flow test further comprises the step of:

reading first and second indicia on the fluid receptacle, wherein a good transmission coolant fluid flow test is indicated when an upper level of the transmission fluid flow within the fluid receptacle collected during the transmission coolant flow test corresponds substantially to a level of the first indicia, and an unacceptable flow test is indicated when the transmission fluid collected during the transmission coolant flow test is at or below a level of the second indicia on the fluid receptacle.

6. The method of claim 5 wherein the step of using the fluid receptacle to perform the vehicle transmission coolant flow test further comprises the step of:

reading a third indicia spaced between the first and second indicia on the fluid receptacle, the third indicia associated with a transmission fluid level within the fluid receptacle collected during conduction of a transmission coolant flow test indicative of an acceptable flow test.

7. The method of claim 1 further comprising the step of:

reading indicia on the fluid receptacle, the indicia containing transmission coolant flow test instructions.

8. A transmission fluid conditioning apparatus for use in performing a transmission coolant flow test, the apparatus comprising:

a fluid receptacle having an aperture flow for receiving transmission fluid during the transmission coolant flow test wherein the transmission coolant flow test includes measuring an amount of transmission fluid held in the fluid receptacle after a predetermined time period, the transmission fluid drawn from a vehicle transmission into the fluid receptacle over the predetermined time period, and the aperture is an open end of the fluid receptacle;

a replacement transmission fluid filter prestored within the receptacle, the replacement fluid filter adapted to replace an existing fluid filter in a vehicle prior to the transmission coolant flow test;

fluid filter installation components prestored within the receptacle for installing the replacement fluid filter in a vehicle transmission coolant circuit in place of the existing fluid filter; and a removable closure member sealing the open end of the fluid receptacle prior to the transmission coolant flow test.

9. The apparatus of claim 8 wherein the fluid filter installation connection components include at least one of a hose, a hose clamp and a hose fitting.

10. The apparatus of claim 8 comprising:

indicia carried on the fluid receptacle for indicating at least one of a good and bad transmission fluid flow test by the amount of transmission fluid held in the fluid receptacle after the predetermined test time period.

11. The apparatus of claim 10 wherein the indicia comprises first and second indicia on the fluid receptacle respectively indicating a good flow test and a bad flow test.

12. The apparatus of claim 11 further comprising:

a third indicia carried on the fluid receptacle and disposed between the first and second indicia for indicating an acceptable coolant flow test.

13. The apparatus of claim 8 further comprising:

a label mounted on the fluid receptacle and containing instructions for conducting the transmission coolant flow test.

14. A transmission fluid conditioning apparatus for use in performing a transmission coolant flow test the apparatus comprising:

a fluid receptacle having an aperture for receiving transmission fluid during a transmission coolant flow test wherein the transmission coolant flow test comprises measuring an amount of transmission fluid held in the fluid receptacle after a predetermined time period, the transmission fluid drawn from a vehicle transmission during the predetermined time period;

a replacement transmission fluid filter prestored within the receptacle, the replacement fluid filter adapted to replace an existing fluid filter in a vehicle prior to the transmission coolant flow test; and indicia carried on the fluid receptacle for indicating at least one of a good and bad transmission fluid flow test by the amount of transmission fluid held in the fluid receptacle after the predetermined time period.

15. The apparatus of claim 14 wherein the indicia comprises first and second indicia on the fluid receptacle respectively indicating a good flow test and a bad flow test.

16. The apparatus of claim 14 further comprising:

a label mounted on the fluid receptacle and containing instructions for conducting the transmission coolant flow test.

\* \* \* \* \*